United States Patent

Santilli et al.

[11] 3,919,211
[45] Nov. 11, 1975

[54] 9-OXOXANTHENE-N,N'-BIS(SUBSTITUTED)-2,7-DISULFONAMIDES

[75] Inventors: Arthur A. Santilli, Havertown; Anthony C. Scotese, King of Prussia; Stanley C. Bell, Penn Valley, all of Pa.

[73] Assignee: American Home Products Corporation, New York, N.Y.

[22] Filed: Feb. 12, 1973

[21] Appl. No.: 331,392

[52] U.S. Cl.... 260/246 B; 260/268 TR; 260/293.58; 260/335; 424/248; 424/250; 424/267; 424/283
[51] Int. Cl.... C07d 7/44; C07d 29/34; C07d 87/46
[58] Field of Search............ 260/247.1, 246 B, 335, 260/293.58, 268 PH, 268 TR

[56] References Cited
UNITED STATES PATENTS

| | | | |
|---|---|---|---|
| 3,067,209 | 12/1962 | Doebel et al. | 260/247.1 P |
| 3,073,847 | 1/1963 | Doebel et al. | 260/247.1 P |
| 3,310,553 | 3/1967 | Bloom et al. | 260/247.1 P |
| 3,755,319 | 8/1973 | Bays | 260/247.1 S |
| 3,801,598 | 4/1974 | Pfister et al. | 260/335 |

*Primary Examiner*—Lorraine A. Weinberger
*Assistant Examiner*—Michael Shippen
*Attorney, Agent, or Firm*—Joseph Martin Weigman

[57] ABSTRACT

The disclosure is directed to 9-oxoxanthene-N,N'-bis(substituted)-2,7-disulfonamides which have the formula

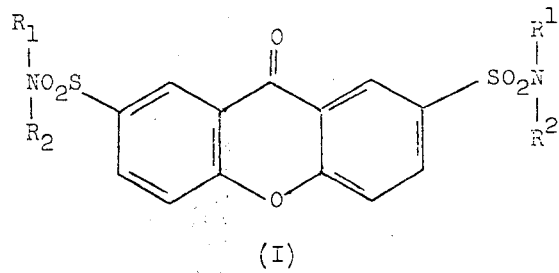

(I)

where
  $R^1$ is hydrogen or lower alkyl;
  $R^2$ is lower alkoxy(lower)alkyl, di(lower)alkylamino(lower)alkyl, halobenzyl or morpholino(lower)alkyl; and
  $R^1$ and $R^2$ taken together with the nitrogen of the sulfonamide group are piperidino, piperazino, phenylpiperazino and morpholino.

The compounds have activity as central nervous system depressants.

8 Claims, No Drawings

9-OXOXANTHENE-N,N'-BIS(SUBSTITUTED)-2,7-DISULFONAMIDES

This invention relates to new and useful 9-oxoxanthene-N,N'-bis(substituted)-2,7-disulfonamides and their pharmaceutically acceptable addition salts. The chemical structure of the compounds of the invention may be schematically represented by

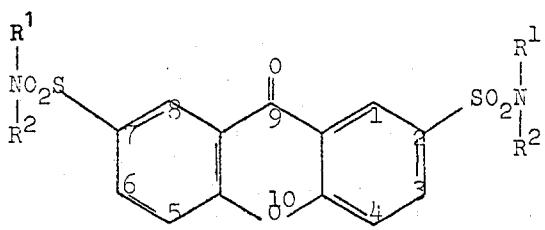

Where
R¹ is hydrogen or lower alkyl;
R² is lower alkoxy (lower) alkyl, di(lower)alkylamino (lower)alkyl, halobenzyl or morpholino(lower)alkyl; and
R¹ and R² taken together with the nitrogen of sulfonamide group are piperidino, piperazino, phenylpiperazino and morpholino.

The term "lower alkyl" as used herein refers to straight chain and branched chain groups having 1 to 3 carbon atoms therein.

Specific embodiments of the invention are 1,1'-(9-oxoxanthene-2,7-diyldisulfonyl)bis(4-phenylpiperazine) and N,N'-bis(2-methoxyethyl)-9-oxoxanthene-2,7-disulfonamide.

The preparation of these compounds may be represented schematically by the following equation:

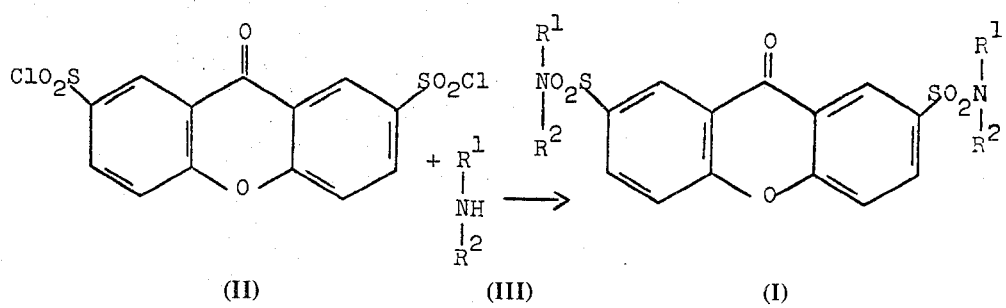

where R₁ and R₂ are as defined above.

The closest known prior art is French Pat. No. 839,698 issued Apr. 1939 (C.S. 33 8025); Belgium Pat. No. 759,292 issued May, 1971 (Derwent 38157S); Netherlands Pat. No. 7,008,636 issued Dec. 1970 (Derwent 00988S) and U.S. Pat. No. 3,532,711 issued Oct. 1970. None of the prior art cited teach or suggest the compounds of the present invention or the utility found for them.

Compounds of the present invention may be prepared by the following procedure. 9-Oxoxanthene is added to chlorosulfonic acid and heated, preferably on a steam bath, for one to five hours, preferably three hours. The reaction mixture is brought to a boil, preferably for about 5 minutes, cooled and cautiously poured on ice. A precipitate deposit may be collected and the product recovered, for instance by recrystallization from benzene. The product is 2,7-di(chlorosulfonyl)xanthen-9-one.

To a solution of pyridine and an amine of Structure III is added 2,7-di(chlorosulfonyl)xanthen-9-one. The reaction mixture is heated, if necessary to produce a clear solution, and is allowed to stand at room temperature for ½ to 16 hours and then poured into water. The product separates as a solid or oily residue and may be recovered by well known means for instance by filtration, and recrystallization from a suitable organic solvent.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 milligrams per kilogram of host body weight (MPK). The animals are watched for a minimum of 2 hours during which time signs of general stimulation, (i.e., increased spontaneous motor activity, hyperactivity on tactile stimulation, twitching), general depression (i.e., decreased spontaneous motor activity, decreased respiration) autonomic activity (i.e., miosis, mydriasis, diarrhea) are noted.

In the above test procedure the compounds of the present invention display depressant activity at 12.7 to 40.0 milligrams per kilogram of host body weight.

All of the compounds have activity as central nervous system depressants. Some have activity as interferon inducers particularly 1,1'-(9-oxoxanthene-2,7-diyldisulfonyl) bis dipiperidine. N,N'-bis(p-chlorobenzyl)-N,N'-dimethyl-9-oxoxanthene-2,7-disulfonamide has activity as an anti-inflammatory and immunosuppressive agent. 4,4'-(9Oxoxanthene-2,7-diyldisulfonyl) dimorpholine has activity as an anti-inflammatory agent. N,N'-Bis(2-morpholinoethyl)9-oxoxanthene-2,7-disulfonamide has anti-tremorine activity and trichomonacidal activity.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intramuscularly, intravenously or subcutaneously. For parenteral administration they may be used in the form of a sterile solution containing other solutes, for example, enough saline or glucose to make the solution isotonic.

The dose of the present pharmacological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without cuasing any harmful or deleterious side effects.

In order to more clearly disclose the nature of the present invention, specific examples of the practice of the invention are hereinafter given. It should be understood, however, that this is done solely by way of example and is intended neither to delineate the scope of the invention nor to limit the ambit of the appended claims. In the examples all temperatures are given in degrees centigrade and the following abbreviations are used: "g" for grams, "ml" for milliliters, and "hr." for hours.

EXAMPLE 1

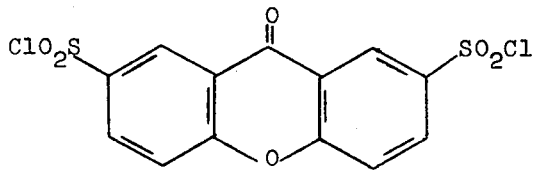

The following illustrates the preparation of a starting material 2,7-di(chlorosulfonyl)xanthen-9-one. Ten grams of 9-oxoxanthene was added to 150 ml of chlorosulfonic acid and heated on a steam bath for 3 hr. The reaction mixture was then brought to a boil for about 5 minutes, cooled and cautiously poured on to ice. A precipitate was deposited which was collected and recrystallized twice from benzene. The product amounted to 10 g and had a melting point of 212°–215°.

Anal. Calcd for $C_{13}H_6Cl_2O_6S_2$: C, 39.71; H, 1.54; Cl, 18.03; S, 16.31. Found: C, 39.74; H, 1.70; Cl, 18.44; S, 16.53.

EXAMPLE 2

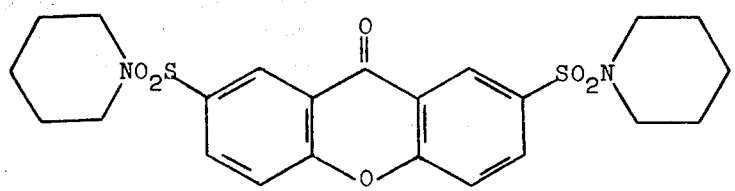

The following illustrates the preparation of 1,1'-(9-oxoxanthene-2,7-diyldisulfonyl)bis dipiperidine.

To 40 ml of pyridine was added 3.4 g of piperidine and 3.9 g of 2,7-di(chlorosulfonyl)xanthen-9-one. The reaction mixture was heated for a few minutes on a hot plate until a clear solution was obtained and was then allowed to remain at room temperature for 30 minutes. The reaction mixture was poured into 700 ml of water and the yellow precipitate that was deposited was collected on a filter and washed with ethanol. There was obtained 3.5 g of product. Recrystallization from dimethylformamide gave 2.0 g of pure product having a melting point of 254°–256°.

The molecular formula $C_{23}H_{26}N_2O_6S_2$ was assumed for the product, and based on that formula it was calculated that the elemental analysis by weight would be 56.31 percent carbon, 5.34 percent hydrogen, and 5.71 percent nitrogen. The assumed formula was determined to be accurate when it was found by analysis that the product actually contained 56.26 percent carbon, 5.38 percent hydrogen and 5.67 percent nitrogen. This may be expressed:

Anal. Calcd for $C_{23}H_{26}N_2O_6S_2$: C, 56.31; H, 5.34; N, 5.71. Found: C, 56.26; H, 5.38; N, 5.67.

When evaluated in the foregoing pharmacological procedure the compound was found to be a central nervous system depressant in that it caused decreased motor activity and decreased respiration at a dose of 12.7 MPK administered parenterally.

The product was evaluated in the following procedure and found to have interferon inducing activity.

The activity of the compounds as interferon inducers was determined as follows. A dose of 2 milligrams per mouse of test compound was injected intraperitoneally. The mouse sera were harvested at 2,6, and 24 hours post-injection. The sera were assayed for interferon in cultures of L-cells (a strain of mouse fibroblasts). The interferon titer ranged from less than to equal to the interferon titer induced by 2,7-bis(2-diethylaminoethyloxy)fluoren-9-one, dihydrochloride (Tilorone).

EXAMPLE 3

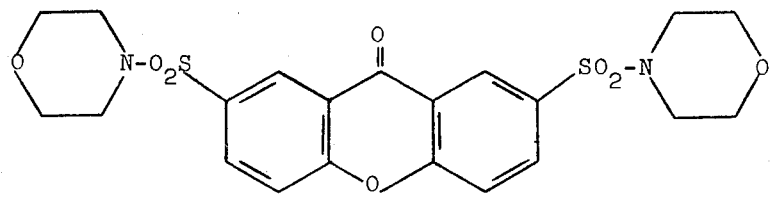

This illustrates the preparation of 4,4'-(9-oxoxanthene-2,7-diyldisulfonyl)dimorpholine.

To 45 ml of pyridine was added 3.48 g of morpholine and 3.9 g of 2,7-di(chlorosulfonyl)xanthen-9-one. The reaction mixture was allowed to sit for 30 minutes at room temperature after the initial heat of reaction had subsided. it was then poured into 800 ml of water. The product which precipitated from the solution was collected on a filter and recrystallized from dimethylformamide giving 3.4 g of product, having a melting point of 308°–310°.

Anal. calcd for $C_{21}H_{22}N_2O_8S_2$: C, 51.00; H, 4.48; N, 5.66; S, 12.97. Found: C, 50.92; H, 4.69; N, 5.37; S, 12.59.

When evaluated in the foregoing pharmacological procedure the compound was found to be a central nervous system depressant at a dose of 12.7 MPK administered parenterally.

The compound was also found to have anti-inflammatory activity when evaluatd in the following procedure.

Anti-inflammatory activity of a compound is assessed by its ability to inhibit experimentally induced edema in the hind paw of the rat. Male Sprague-Dawley rats weighing 120–160 grams are used as hosts. The compound to be tested is administered orally as a solution or suspension in distilled water (plus two drops Tween 80) in a volume of 10 milliliters per kilogram of host body weight. Each compound is given to six rats and vehicle along is administered to six more rats as a control. Sixty minutes after drug administration, edema is induced by an injection of 0.05 ml of 1 percent carrageenin solution in saline into the subplantar tissue of the rat's right hind paw. Paw volume is then immediately measured volumetrically with a plethysmograph and is measured again 3 hours later. The mean volume of swelling for the control group is calculated and compared to the test groups. Compounds that inhibit swelling approximately 20 percent as compared to controls are considered active. Inhibition is calculated by the formula:

Percent Inhibition = $\dfrac{\text{Mean vol. swelling of control} - \text{mean vol. swelling of test}}{\text{Mean vol. swelling of control}} \times 100$ The compound was found to cause 23 percent inhibition.

EXAMPLE 4

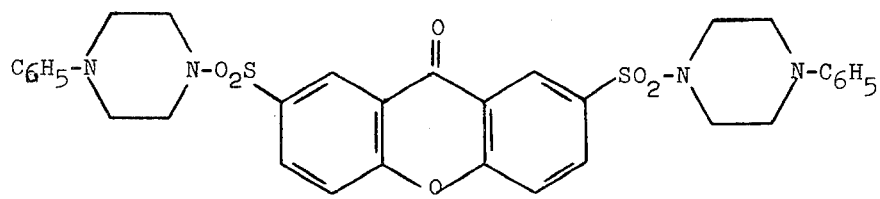

This illustrates the preparation of 1,1'-(9-oxoxanthene-2,7-diyldisulfonyl)bis(4-phenylpiperazine).

To 45 ml of pyridine was added 6.5 g of 1-phenylpiperazine and 3.9 g of 2,7-di(chlorosulfonyl)xanthen-9-one. After allowing the reaction mixture to stand at room temperature for 1 hr. it was poured into 400 ml of water. A yellow precipitate was formed which was removed by filtration and recrystallized from aqueous dimethylformamide. There was obtained 2.5 g of product, having a melting point of 312°–315°.

Anal. Calcd for $C_{33}H_{32}N_4O_6S_2$: C, 61.47; H, 5.00; N, 8.69. Found: C, 61.35; H, 5.24; N, 8.41.

When evaluated in the foregoing pharmacological procedure the compound was found to be a central nervous system depressant in that it caused decreased respiration and decreased motor activity at a dose of 12.7 MPK administered parenterally.

EXAMPLE 5

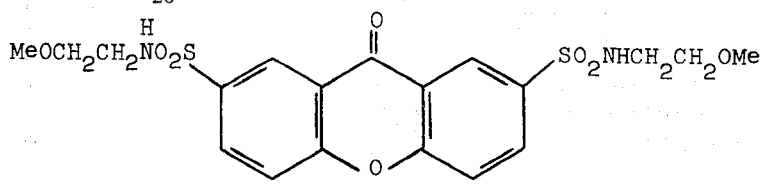

The following illustrates the preparation of N,N'-bis(2-methoxyethyl)-9-oxoxanthene-2,7-disulfonamide.

To 50 ml of pyridine was added 4.5 g of 2-methoxyethylamine followed by the portion-wise addition of 3.93 g of 2,7-di (chlorosulfonyl)xanthen-9-one. After allowing the reaction to stand overnight at room temperature, the reaction mixture was poured into 900 ml of water. A precipitate was obtained which amounted to 6.45 g and had a melting point of 198°–200°. Recrystallization from N,N-dimethylformamide gave 4.0 g of product, having a melting point of 200°–203°.

Anal. Calcd for $C_{19}H_{22}N_2O_8S_2$: C, 48.50; H, 4.71; N, 5.95; S, 13.63. Found: C, 48.49; H, 4.89; N, 6.06; S, 13.07.

When evaluated in the foregoing pharmacological procedure the compound was found to be a central nervous system depressant in that it caused decreased respiration and decreased motor activity at a dose of 12.7 MPK administered parenterally.

EXAMPLE 6

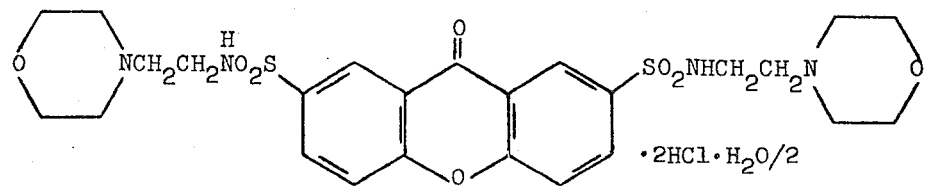

The following illustrates the preparation of N,N'-bis(2-morpholinoethyl)-9-oxoxanthene-2,7-disulfonamide, hydrochloride, hemihydrate.

To 50 ml of pyridine was added 5.2 g of N(2-aminoethyl) morpholine followed by the addition of 3.93 g of 2,7-di (chlorosulfonyl)xanthen-9-one. After allowing the reaction mixture to stand for 3 hours it was poured into 1.5 liters of water. A crystalline product separated which was collected and washed with ethanol. This free base amounted to 5.5 g, and had a melting point of 240°–242°. The free base was added to 150 ml of ethanol and hydrogen chloride gas was bubbled into the mixture for a few minutes. The mixture was heated on a hot plate and sufficient water was added to obtain a clear solution. The reaction solution was charcoaled and filtered. The crystalline product which deposited on cooling the filtrate amounted to 3.9 g, and decomposed at 279°–280°.

Anal. Calcd for $C_{25}H_{34}Cl_2N_4O_8S_2 \cdot H_2O/2$: C, 45.32; H, 5.32; N, 8.45; Cl, 10.70; S, 9.68. Found: C, 45.26; H, 5.31; N, 8.44; Cl, 10.24 S, 9.68.

When evaluated in the foregoing pharmacological procedure the compound was found to be a central nervous system depressant at a dose of 12.7 MPK administered parenterally.

The compound was found to have anti-tremorine activity by the following procedure. A literature reference is Everett et al. Science 124:79, 1956.

Compounds at a number of dose levels are administered orally (or intraperitoneally) to groups of six mice (three males and three females) at each dose level. One hour later (or one-half hour later if the compound is administered intraperitoneally) the animals are challenged with tremorine 30 milligrams per kilogram of host body weight (MPK) administered intraperitoneally. The animals are graded at one-half hour, 1 hour and 2 hours for degree of tremors, salivation, lacrimation and diarrhea.

Protection against these symptoms is determined by a comparison with controls run simultaneously. Congentin may be used as a standard compound.

Percent antagonism at each time interval is calculated as follows:

$$\text{Percent antagonism} = \frac{\text{average score (control)} - \text{average score (test)}}{\text{average score control}} \times 100$$

The compound was found to have Trichomonacidal activity in vitro when evaluated as follows.

A 12.5 milligram portion of test material (as based on the active moiety) is added to 2.5 milliliter (ml) of 1 percent phosphate buffer at pH 6. Further two-fold dilutions are made in the same buffer. A 1 milliliter volume of each dilution is transferred to small sterile screw cap assay tubes containing 3.8 milliliters of Diamond medium (formula furnished by American Type Culture Collection, Rockville, Md.) and 0.1 ml of calf serum. Each assay tube is inoculated with 0.1 milliliters of a 48–72 hour culture of Trichomonas vaginalis strain ATCC No. 13972. A control assay tube containing no test material is similarly inoculated. The assay tubes are gently shaken and then incubated for 48 hours at 30°C. Following incubation the tubes are gently shaken and with the aid of a Pasteur pipette a drop is deposited on a Spiers-Levy eosinophil counting chamber. The chamber is examined by phase contrast microscopy. The number of organisms present in one square millimeter is multiplied by 5000 in order to express the count per milliliter. The difference between the number of organisms present in the control tube and in the tubes containing the test material represents the relative potency of the test material and is expressed as the percentage kill at the specific dose level. Metronidazole may be used as a suitable positive control test material.

The compound showed a 40 percent kill.

EXAMPLE 7

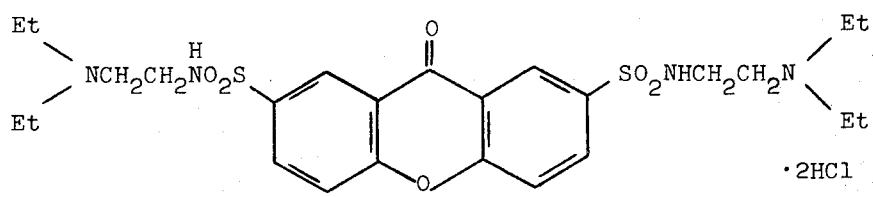

The following illustrates the preparation of N,N'-bis(2-diethylaminoethyl)-9-oxoxanthene-2,7-disulfonamide, dihydrochloride.

To 50 ml of dry pyridine was added 9.3 g of N,N'-diethylethylene diamine followed by the portion wise addition of 7.86 g of 2,7-di(chlorosulfonyl)xanthen-9-one. The reaction mixture was allowed to stand at room temperature for 1 hr. and was then poured into 350 ml of water. An oily residue was deposited which crystallized to give 9.5 g of free base having a melting point of 110°–112°. This material was dissolved in 150 ml of ethanol and hydrogen chloride gas was bubbled into the solution for approximately 15 minutes. A crystalline material was deposited after a few minutes. The reaction mixture was cooled in ice and filtered. The filter cake was recrystallized from ethanol giving 7.3 g of product, having a melting point of 180°–182°.

Anal. Calcd for $C_{25}H_{36}N_4O_6S_2 \cdot 2HCl$: C, 47,99; H, 6.12; N, 8.96; Cl, 11.33. Found: C, 47.72; H, 6.39; N, 8.92; Cl, 11.57.

When evaluated in the foregoing pharmacological procedure the compound was found to be a central nervous system depressant in that it caused decreased respiration and decreased motor activity at a dose of 40 MPK administered either orally or parenterally.

The product was evaluated in the interferon induction procedure described in Example 2 and found to have interferon inducing activity.

EXAMPLE 8

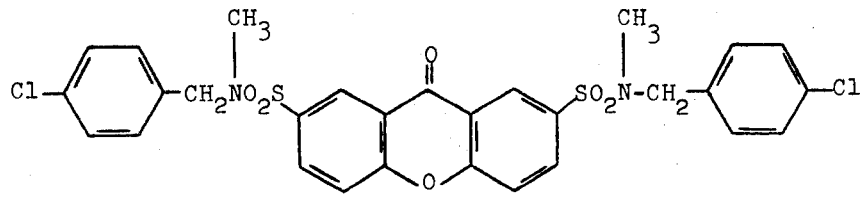

The following illustrates the preparation of N,N'-bis(p-chlorobenzyl)-N,N'-dimethyl-9-oxoxanthene-2,7-disulfonamide.

To 40 ml of pyridine was added 6.2 g of p-chloro-N-methylbenzylamine and 3.9 g of 2,7-di(chlorosulfonyl)xanthen-9-one. A yellow precipitate was deposited. The reaction mixture was heated on a hot plate until a clear solution was obtained and then allowed to cool to room temperature. The mixture was poured into 700 ml of water. The precipitate which was deposited was collected and amounted to 6.1 g, having a melting point of 238°–241°. Recrystallization from dimethylformamide gave 5.0 g of product having a melting point of 241°–243°.

Anal. Calcd for $C_{29}H_{24}N_2O_6Cl_2S_2$: C, 55.15; H, 3.83; N, 4.43. Found C, 55.15; H, 3.93; N, 4.64.

When evaluated in the foregoing pharmacological procedure the compound was found to be a central nervous system depressant at a dose of 12.7 MPK administered parenterally.

The compound was also found to be an immunosuppressive agent when evaluated as follows.

Polyarthritis is induced in male Lewis strain rats (150–200 mgs.) by the injection of a suspension of tubercle bacilli in mineral oil in the subplantar tissue of the right hind paw. Drug therapy is either begun on the day of antigen or can be started after appearance of an established arthritic syndrome (14 days). Compounds are administered daily in the form of a fine suspension by stomach tube. Body weights, left and injected right paw volumes and occurrence of arthritic nodules on the ears, tail and front paws are determined at frequent intervals over a 14 to 21 day period. All animals are then autopsied and stress organ weights, hematololgy, histopathology and biochemical studies on blood proteins are done. Active compounds will either prevent or reverse the joint swelling and associated sequella of polyarthritis with minimal toxicity.

Compounds used as standards are Cortisone, phenylbutazone, indomethacin, aspirin, and 6-mercaptopurine. Literature references are Newbould, B.B. Brit. J. Pharm. Chemoth. 21:127, 1963 and Rosenthale, M.E. and Nagra, C.L. Proc. Soc. exp Biol. and Med. 125:149, 1967.

The compound showed 26 percent protection against acute inflammation.

What is claimed is:

1. A compound selected from those having the formula

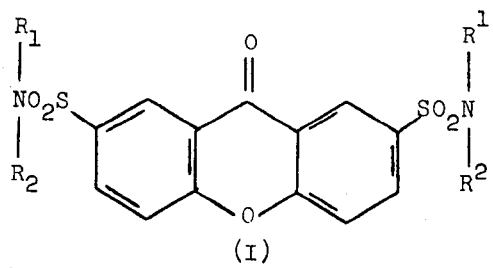

wherein $R^1$ is hydrogen or lower alkyl;

$R^2$ is lower alkoxy(lower)alkyl, di(lower)alkylamino (lower)alkyl, halobenzyl or morpholino(lower)alkyl; and $R^1$ and $R^2$ taken together with the nitrogen of the sulfonamide group are piperidino, piperazino, phenylpiperazino and morpholino;

and their pharmaceutically acceptable acid-addition salts.

2. A compound as defined in claim 1 which is 1,1'-(9-oxoxanthene-2,7-diyldisulfonyl)dipiperidine.

3. A compound as defined in claim 1 which is 4,4'-(9-oxoxanthene-2,7-diyldisulfonyl)dimorpholine.

4. A compound as defined in claim 1 which is 1,1'-(9-oxoxanthene-2,7-diyldisulfonyl)bis(4-phenylpiperazine).

5. A compound as defined in claim 1 which is N,N'-bis (2-methoxyethyl)-9-oxoxanthene-2,7-disulfonamide.

6. A compound as defined in claim 1 which is N,N'-bis (2-morpholinoethyl)-9-oxoxanthene-2,7-disulfonamide, dihydrochloride, hemihydrate.

7. A compound as defined in claim 1 which is N,N'-bis (2-diethylaminoethyl)-9-oxoxanthene-2,7-disulfonamide, dihydrochloride.

8. A compound as defined in claim 1 which is N,N'-bis-chlorobenzyl)-N,N'-dimethyl-9-oxoxanthene-2,7-disulfonamide.

* * * * *

UNITED STATES PATENT AND TRADEMARK OFFICE
CERTIFICATE OF CORRECTION

PATENT NO. : 3,919,211
DATED : November 11, 1975
INVENTOR(S) : Arthur A. Santilli, Anthony C. Scotese and Stanley C. Bell It is certified that error appears in the above-identified patent and that said Letters Patent are hereby corrected as shown below:

Claim 8 should read --- A compound as defined in Claim 1 which is $\underline{N},\underline{N}'$-bis ($\underline{p}$-chlorobenzyl)-$\underline{N},\underline{N}'$-dimethyl-9-oxoxanthene-2,7-disulfonamide.

Signed and Sealed this ninth Day of March 1976

[SEAL]

Attest:

RUTH C. MASON
*Attesting Officer*

C. MARSHALL DANN
*Commissioner of Patents and Trademarks*